2,803,639

OXIDATION OF PETROLEUM WAX

Bertrand W. Greenwald, Camden, N. J., assignor to Cities Service Research and Development Company, New York, N. Y., a corporation of New Jersey No Drawing. Application July 30, 1953, Serial No. 371,409

8 Claims. (Cl. 260—452)

This invention relates to a process for preparing oxygenated compounds by the oxidation of petroleum wax, and more particularly to the treatment of fractions of the oxidized product to decrease the proportion of oxygenated materials therein whereby to obtain a product better suited for recycle to the oxidation step.

The oxidation of petroleum wax to produce fatty acids, alcohols, and ketones by air blowing at elevated temperatures, has long been known to the art. In order to arrive at the desired product distribution, with the minimum production of undesirable products such as multifunctional compounds, odor bodies, and resins, it is customary to stop the oxidation when a desired neutralization number has been reached, and to separate the oxy products from the unoxidized wax. This separation may be made by extraction with polar solvents such as lower boiling alcohols or ketones to obtain an extract rich in oxy chemicals and raffinate rich in unoxidized wax. The extract may then be treated in a conventional manner to recover purified products.

The raffinate, which will usually comprise about half of the crude oxidate, will, however, contain in addition to unoxidized wax, certain quantities of oxygenated compounds, depending on the nature of the solvent employed, the solvent feed ratio, and other conditions employed. Since, to minimize difficulties in processing the extract, it is desirable to hold the wax content thereof to a minimum, the solvent employed is desirably one having high selectivity for oxygenated compounds. Such solvents do not usually possess high capacity, and as a result the raffinate may contain from about 10 to about 30 percent of oxygenated materials. If the raffinate is then mixed with fresh wax and recycled to the oxidation step, its oxygenated content will be subjected to further oxidation, resulting in the formation of undesired multifunctional compounds such as hydroxy acids, keto acids, and lactones, which, in the subsequent extraction step, will pass into the extract and contaminate the products recovered therefrom. Oxidation will also result in the formation of resins, which are insoluble in the solvents employed, and will build up in the raffinate, and consequently in the fresh wax-raffinate mixture which is to be subjected to further oxidation. While these resins are not extracted from the crude oxidate in the extraction step, and therefore do not contaminate the final product, they are undesirable because they tend to cause the solvent to emulsify with the crude oxidate making it very difficult to break the mixture into extract and raffinate phases. For the above reasons it has not heretofore been found practicable to recycle the raffinate to the oxidation step so as to oxidize the wax to extinction.

It is therefore an object of this invention to treat the raffinate from an extraction of crude wax oxidate in such a manner as to recover one fraction substantially poorer in oxygenated compounds than the starting material suitable for recycle to the oxidizer, and a second fraction substantially richer in oxygenated materials, which may be recycled to the extraction step, or to some other stage of the process. It is another object of this invention to remove substantially all resinous materials from the raffinate.

I have found that the foregoing objects may be attained by adsorption of the raffinate on active carbon, followed by a two stage desorption, using in the first stage a non-polar desorbent, such as a low boiling hydrocarbon, and using a polar desorbent, such as, for example, methyl ethyl ketone, chloroform, or pyridine in the second stage. The first stage desorbate is recovered and heated to drive overhead the desorbent, which is returned to the process, leaving as a bottoms product material substantially richer in paraffin than the raffinate feed. This material may, of course, if its oxygen content is still undesirably high, be subjected to one or more additional adsorption-desorption steps to reduce the oxygen content to the desired point, and may then be recycled to the oxidation step. It has been found that the desorbate is substantially free of resinous materials, and that upon subsequent oxidation, emulsion difficulties in the extraction step are substantially eliminated.

The second stage desorbate may be freed of desorbent by conventional methods, and may be recycled to the crude oxidate extraction zone.

The following table illustrates the results obtained by my new process in two typical runs using as feed stocks raffinates obtained from a methanol extraction of a crude wax oxidate containing about 50% oxy compounds.

| Charge | | Desorbents | 1st Desorbate | | 2nd Desorbate | | Loss | |
|---|---|---|---|---|---|---|---|---|
| Wt., g. | Percent wax | | Wt., g. | Percent wax | Wt., g. | Percent wax | Wt., g. | Percent |
| 100 | 71 | (1) Heptane (2) MEK+HCCL$_3$ | 78 | 80 | 15 | 49 | 7 | 7 |
| 30 | 82.5 | (1) Heptane (2) Pyridine | 25 | 88 | 4 | 50 | 1 | 3.3 |

Both first and second desorbates were almost water white in color, and free from objectionable odors, whereas in both runs the raffinate charge was dark in color, and had an objectionable odor.

Having now described my invention, what is claimed is:

1. A process for treating a mixture of paraffin wax and oxygenated hydrocarbon compounds obtained as raffinate in the solvent extraction following oxidation of petroleum wax which comprises, adsorbing the mixture on activated carbon, desorbing the carbon and adsorbed material in a first stage desorption with a low boiling, non-polar, hydrocarbon solvent, recovering a desorbate from said first stage desorption and separating therefrom a product poorer in oxygenated hydrocarbon compounds than the original mixture, desorbing the carbon and adsorbed material in a second stage desorption with a polar solvent selected from the group consisting of methyl ethyl ketone, chloroform and pyridine, recovering a desorbate from said second stage desorption and separating therefrom a product richer in oxygenated compounds than said original mixture.

2. The process according to claim 1 in which the non polar desorbent is heptane.

3. The process according to claim 1 in which the polar solvent is chloroform.

4. The process according to claim 1 in which the polar solvent is pyridine.

5. The process according to claim 1 in which the non polar solvent is heptane and the polar solvent is methyl ethyl ketone.

6. The process according to claim 1 in which the non polar solvent is heptane and the polar solvent is pyridine.

7. The process according to claim 1 in which the polar solvent is chloroform.

8. A process for treating a mixture of paraffin wax and oxygenated hydrocarbon compounds obtained as raffinate in the solvent extraction following oxidation of petroleum wax which comprises adsorbing the mixture on activated carbon, treating the carbon and adsorbed material in a first stage desorption operation with a low boiling, non-polar, paraffinic hydrocarbon solvent having highly preferential desorbing properties for the paraffin wax in said mixture, recovering a desorbate from said first stage desorption operation, passing said desorbate to a distillation operation, withdrawing an overhead of substantially pure desorbent from said distillation operation and a paraffin wax bottoms product, recycling the desorbent overhead to the first stage desorption operation, recycling said paraffin wax bottoms product to further oxidation treatment, treating the carbon and adsorbed material in a second stage desorption operation with a polar desorbent selected from the group consisting of methyl ethyl ketone, chloroform, and pyridine, recovering a desorbate from said second stage desorption operation; passing said desorbate to a distillation operation, withdrawing an overhead of substantially pure desorbate from said distillation operation and a bottoms product richer in oxygenated compounds than said original mixture, recycling the desorbent overhead to the second stage desorption operation and passing the withdrawn oxygenated bottoms product to further separation treatment.

References Cited in the file of this patent
UNITED STATES PATENTS

| | | |
|---|---|---|
| 2,449,402 | Lipkin et al. | Sept. 14, 1948 |
| 2,459,442 | Lipkin | Jan. 18, 1949 |
| 2,564,717 | Olsen | Aug. 21, 1951 |
| 2,621,203 | Cope | Dec. 9, 1952 |
| 2,698,336 | Nelson | Dec. 28, 1954 |

OTHER REFERENCES

U. S. Naval Technical Mission Report 248–45 (1946), page 88.